United States Patent [19]

Haraguchi et al.

[11] Patent Number: 4,489,692

[45] Date of Patent: Dec. 25, 1984

[54] IGNITION TIMING CONTROL SYSTEM FOR INTERNAL COMBUSTION ENGINE WITH KNOCK SENSOR

[75] Inventors: Hiroshi Haraguchi, Kariya; Kou Narita; Toshiharu Iwata, both of Aichi; Yasutoshi Baba, Oobu, all of Japan

[73] Assignee: Nippondenso Co., Ltd., Kariya, Japan

[21] Appl. No.: 471,727

[22] Filed: Mar. 3, 1983

[30] Foreign Application Priority Data

Mar. 5, 1982 [JP] Japan .................................. 57-35638
Mar. 8, 1982 [JP] Japan .................................. 57-36994
Mar. 10, 1982 [JP] Japan .................................. 57-37421

[51] Int. Cl.³ .............................. F02P 5/14; F02P 5/08
[52] U.S. Cl. ..................................... 123/425; 123/419
[58] Field of Search ............... 123/425, 419, 340, 422, 123/423; 60/626; 73/116; 364/431

[56] References Cited

U.S. PATENT DOCUMENTS

| | | | |
|---|---|---|---|
| 4,269,154 | 5/1981 | Iwata et al. | 123/425 |
| 4,269,155 | 5/1981 | Iwata et al. | 123/425 |
| 4,340,021 | 7/1982 | Oshiage et al. | 123/425 |
| 4,344,400 | 8/1982 | Asano | 123/425 |
| 4,382,429 | 5/1983 | Enoshima et al. | 123/425 |
| 4,428,342 | 1/1984 | Suzuki et al. | 123/419 |
| 4,428,343 | 1/1984 | Schweikert et al. | 123/425 |
| 4,428,344 | 1/1984 | Focht | 123/425 |

Primary Examiner—Raymond A. Nelli
Attorney, Agent, or Firm—Cushman, Darby & Cushman

[57] ABSTRACT

A spark timing control apparatus controls the spark timing to retard or advance in accordance with the output signal from a knock sensor. An accelerating condition of the engine is determined depending on a particular knock occurence patterns including; whether the interval of knock occurences is larger or small, the total amount of retard angles is larger or small, or the frequency of knock occurences. When the accelerating condition is determined, the advancing rate of the spark timing is increased until a steady state of the engine operation is determined based on the output signal of the knock sensor.

9 Claims, 15 Drawing Figures

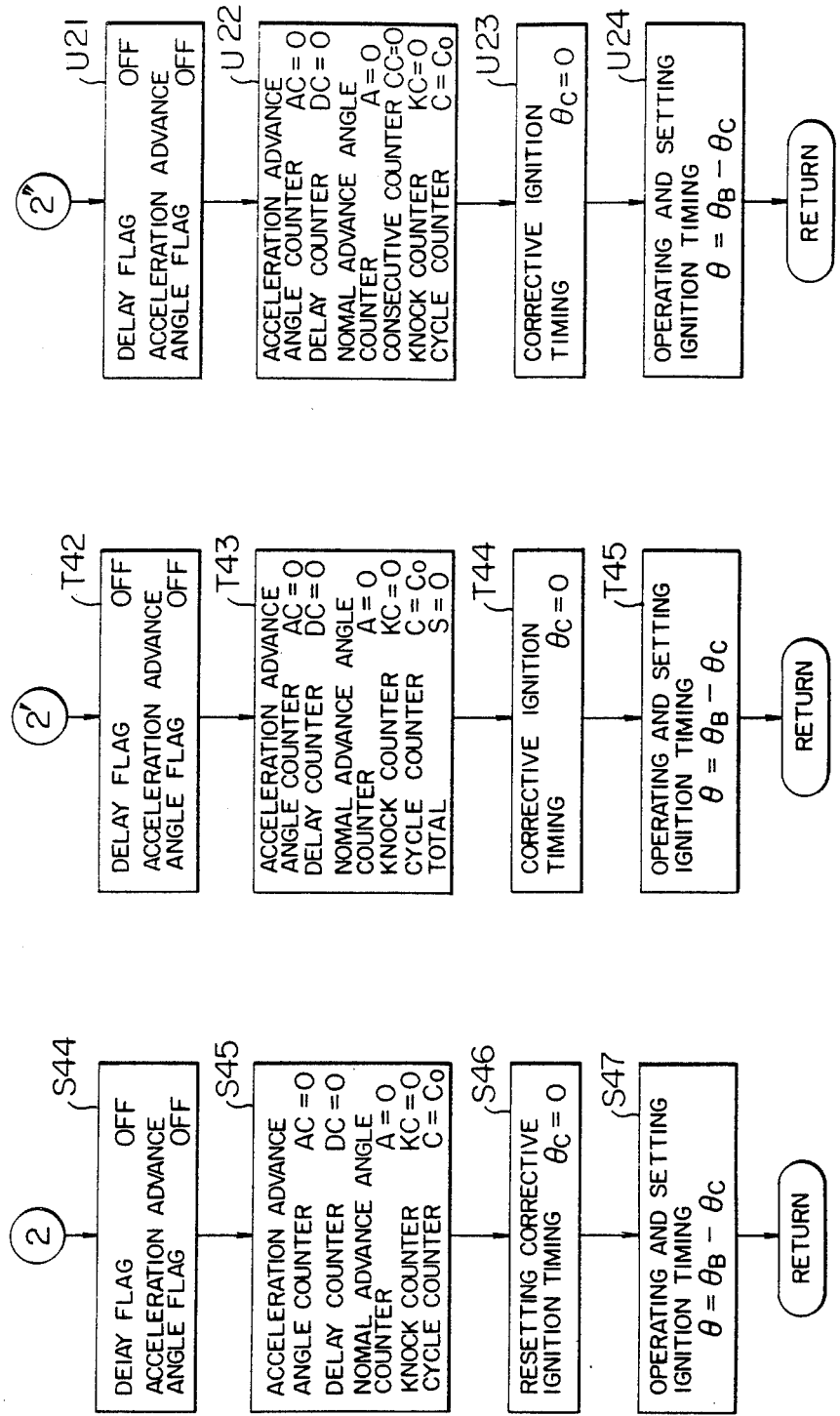

IGNITION TIMING CONTROL SYSTEM FOR INTERNAL COMBUSTION ENGINE WITH KNOCK SENSOR

BACKGROUND OF THE INVENTION

1. Field of the Invention

This invention relates to an ignition timing control system for an internal combustion engine having a function of detecting a knock in the engine to advance or retard an angle for ignition timing. The system will hereinafter be referred to as a knock control system.

2. Description of the Prior Art

In recent years, the knock control system which detects a knock occurring in the engine to advance or retard an angle for ignition timing in accordance with a state of the knock has been discussed from various standpoints of view. By using the knock control system, it is possible to constantly control the ignition timing toward neighborhood of a limit for the knock so that fuel consumption and output performance of the engine can be utilized at a maximum efficiency independently of irregularity and aging of the engine.

A prior art knock control system, however, faces a fatal problem that engine running is degraded during acceleration, or the acceleration cannot be achieved perfectly. More particularly, the ignition timing is retarded considerably because of consecutive generation of knocks immediately after initiation of acceleration, resulting in a delayed acceleration. This problem is attributable to the fact that the ignition timing required for a transient condition, especially, a rapid acceleration varies abruptly with the result that speeds of advance angle operation by the knock control system cannot follow the abrupt variation. As well known in the art, as amounts of advance angle averaged over a unit time or a unit cycle (hereinafter referred to as advance angle rate) increase, so that knock control system needs to follow critically the transient condition. With an increased advance angle rate, however, the ignition timing under normal running of the engine varies to a great extent and torque varies excessively, resulting in degradation of drive-ability under the normal running. For these reasons, the prior art system adopts an advance angle rate of, for example, 1° CA (crank angle)/second which is a compromise between the normal condition and transient condition, failing to satisfy compatibility with both the normal running and the transient condition (especially with transient performance). In view of the above, in order to present an essential solution to elimination of delay in acceleration, it is necessary to increase the advance angle rate only during acceleration and to maintain a small advance angle during normal running.

A countermeasure therefor is conceivable wherein the acceleration state is judged by detecting engine conditions such as for example engine speed and manifold pressure and the advance angle rate is varied on the basis of the detection results. However, the knock condition in the engine, accordingly, the retard angle condition for ignition timing greatly depends on environmental conditions, aging and the like. Therefore, if the advance angle rate is increased indiscreetly on the basis of acceleration information derived from the engine conditions, a rapid advance angle operation will be effected even when the ignition timing is substantially in condition for the normal running, giving rise to frequent generation of excessive knocks and excessive variation in torque. Such inconveniences are due to the effectuation of the advance angle rate in disregard of the knock state or retard angle condition under acceleration and following knock state or advance angle condition.

SUMMARY OF THE INVENTION

The present invention contemplates elimination of the prior art drawbacks and has for its object to provide an ignition timing control system for an internal combustion engine capable of improving knock control under engine acceleration to eliminate delay in acceleration and of improving drive-ability under normal running of the engine following acceleration.

According to one aspect of the present invention, the advance angle rate is increased by judging the acceleration state on the basis of the magnitude of the knock generation interval derived from information from a knock sensor, and the advance angle rate is decreased by judging that the normal running is reached on the basis of the advance angle state after the increase of the advance angle rate or the information from the knock sensor.

According to another aspect of the invention, the advance angle rate is increased by judging the acceleration state on the basis of the total of consecutive retard angles, and the advance angle rate is decreased by judging that the normal running is reached on the basis of the advance angle state after the increase of the advance angle rate or information from a knock sensor.

According to still another aspect of the invention, the advance angle rate is increased by judging the acceleration state on the basis of consecutive occurrence of a plurality of events wherein the knock generation interval is smaller than a predetermined value, and the advance angle rate is decreased by judging that the normal running is reached on the basis of the advance angle state after the increase of the advance angle rate or information from a knock sensor.

Accordingly, the present invention is advantageous in that delay in acceleration can be eliminated while maintaining stable drive-ability under normal running.

In addition, the system of the present invention is inexpensive by dispensing with a special acceleration detector and assures stable control independently of environmental conditions and aging.

BRIEF DESCRIPTION OF THE DRAWINGS

FIGS. 5, 6 and 7 are flow charts illustrative of operation procedure in the control circuit according to a first embodiment of the invention.

FIGS. 9, 10 and 11 are flow charts illustrative of operation procedure in the control circuit according to a second embodiment of the invention.

FIGS. 13 and 14 are flow charts illustrative of operation procedure in the control circuit according to a third embodiment of the invention.

DESCRIPTION OF THE PREFERRED EMBODIMENTS

In describing technical grounds of the present invention, methods of judging acceleration on the basis of information from the knock sensor will first be explained.

(a) The most significant difference in knock generation patterns between the normal running state and the acceleration state is the generation frequency of knocks or the frequency of occurrences of knocks. Specifically, knocks are generated discretely at a small knock generation frequency under the normal running whereas they are generated frequently at a large generation frequency under the acceleration. Accordingly, as far as the time interval or ignition cycle interval between adjacent knocks (hereinafter referred to as knock generation interval) is concerned, the knock generation interval is long during the normal running whereas it is short during the acceleration. However, in studying the knock generation interval in greater detail, it has been proven that the knock generation interval sometimes happens to be short even under the normal running and the increase of the advance angle rate in such a case degrades drive-ability during the normal running.

In this connection, it was found that the acceleration state and the normal running state could be discriminated from each other with high accuracies by judging whether knocks of relatively large intensity were generated within a short time interval. In other words, it was found that while, under the normal running, the short knock generation interval took place, the consecutive occurrence of knocks of relatively large intensity did not prevail within a short time interval and the latter case was in existence only under the acceleration. Based on this principle, even when it is judged from the engine conditions that the acceleration state is in existence, the existing acceleration state will of course be disregarded if owing to environmental conditions and the like, knocks of relatively large intensity do not occur consecutively. In such a case, however, the increase of the advance angle rate is not required inherently and the above principle can be applied rationally.

Figure 12A:
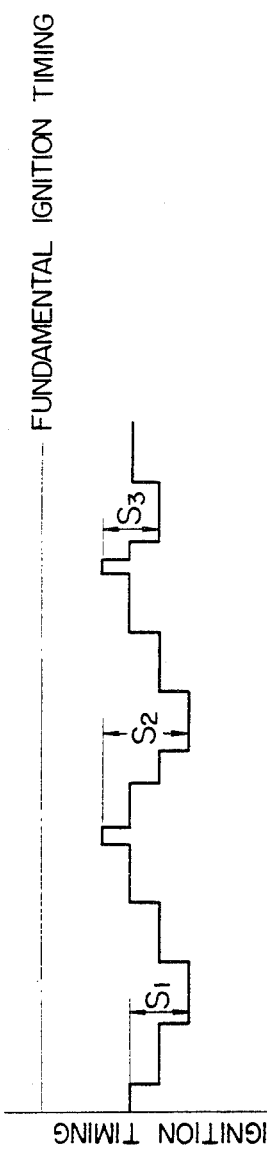
FIG. 12a is a graph showing a control excursion of ignition timing under normal running.
Figure 12B:
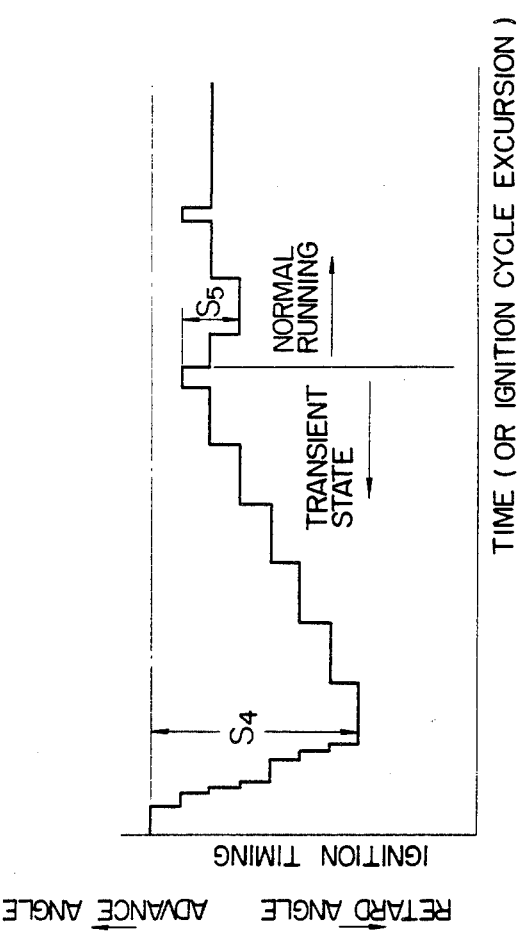
FIG. 12b is a graph showing a control excursion of ignition timing under acceleration.

(b) The inventors of the present application studied carefully ignition timing control excursions under the normal running and acceleration to find out significant differences therebetween. Thus, reference should be made to FIG. 12a showing an ignition timing control excursion under the normal running and FIG. 12b showing an ignition timing control excursion under the acceleration. As will be seen from FIG. 12a, the total (S1, S2 or S3) of consecutive retard angles excluding any advance angle is relatively small. In contrast therewith, the total S4 in FIG. 12b is very large. Under the normal running state following the transient state, the total of consecutive retard angles is again reduced as represented by S5. Thus, it was found that the acceleration state and the normal running state could be discriminated from each other with high accuracies by using the total S of consecutive retard angles exclusive of any advance angle.

As in the precedence, based on this principle, even when it is judged from the engine conditions that the acceleration is in existence, the existing acceleration state will of course be disregarded if owing to environmental conditions and the like, the total does not become satisfactorily large. In such a case, however, the increase of the advance angle rate is not required inherently and the above principle can be applied rationally.

(c) The inventors of the present application found that the acceleration state and the normal running state could be discriminated from each other with high accuracies by examining consecutive occurrence of a plurality of events wherein the knock generation interval was small. In other words, it was found that while, under the normal running, the short knock generation interval took place, the consecutive occurrence of a plurality of events wherein the knock generation interval was small did not prevail and the latter case was in existence only during acceleration.

Based on this principle, even when it is judged from the engine conditions that acceleration is occurring, the existing acceleration state will of course be disregarded if, owing to environmental conditions and the like, knocks do not occur so frequently. In such a case, however, the increase of the advance angle rate is not required inherently and the above principle can be applied rationally.

Next, when the normal running is reached following the increase of the advance angle rate, the advance angle rate is decreased as will be described below. When the advance angle rate is increased after acceleration, the advance angle is preferably directed toward a target value which corresponds to a fundamental ignition timing (that is, an ignition timing at which the retard angle by the knock control system is zero) determined by the distributor or the base map of a microcomputer or which corresponds to an ignition timing slightly retarded relative to the fundamental ignition timing (that is, an ignition timing at which the retard angle is a predetermined value $\alpha$). The target value may otherwise correspond to an ignition timing which undergoes a predetermined advance angle after the advance angle rate is increased. In many cases, however, the advancing of angle passes through a limit ignition timing for knock under the normal running before the advance angle reaches the target value, thus resulting in the generation of knock. Accordingly, it is possible to smoothly shift the control operation to a stable control state under the normal running by decreasing the advance angle rate at the time of the generation of knock or at the time of a predetermined number of generations of knock.

More effectively, the aforementioned initiation time for increasing the advance angle rate may be delayed slightly (a predetermined time interval or a predetermined cycle) from a timing at which the knock generation pattern satifies the aforementioned conditions, because the knock under the acceleration is exactly passed by during the delay so that the knock occurring after the increase of the advance angle rate is duly regarded as one under the normal running.

The invention will now be described by way of example with reference to the drawings.

Figure 1:
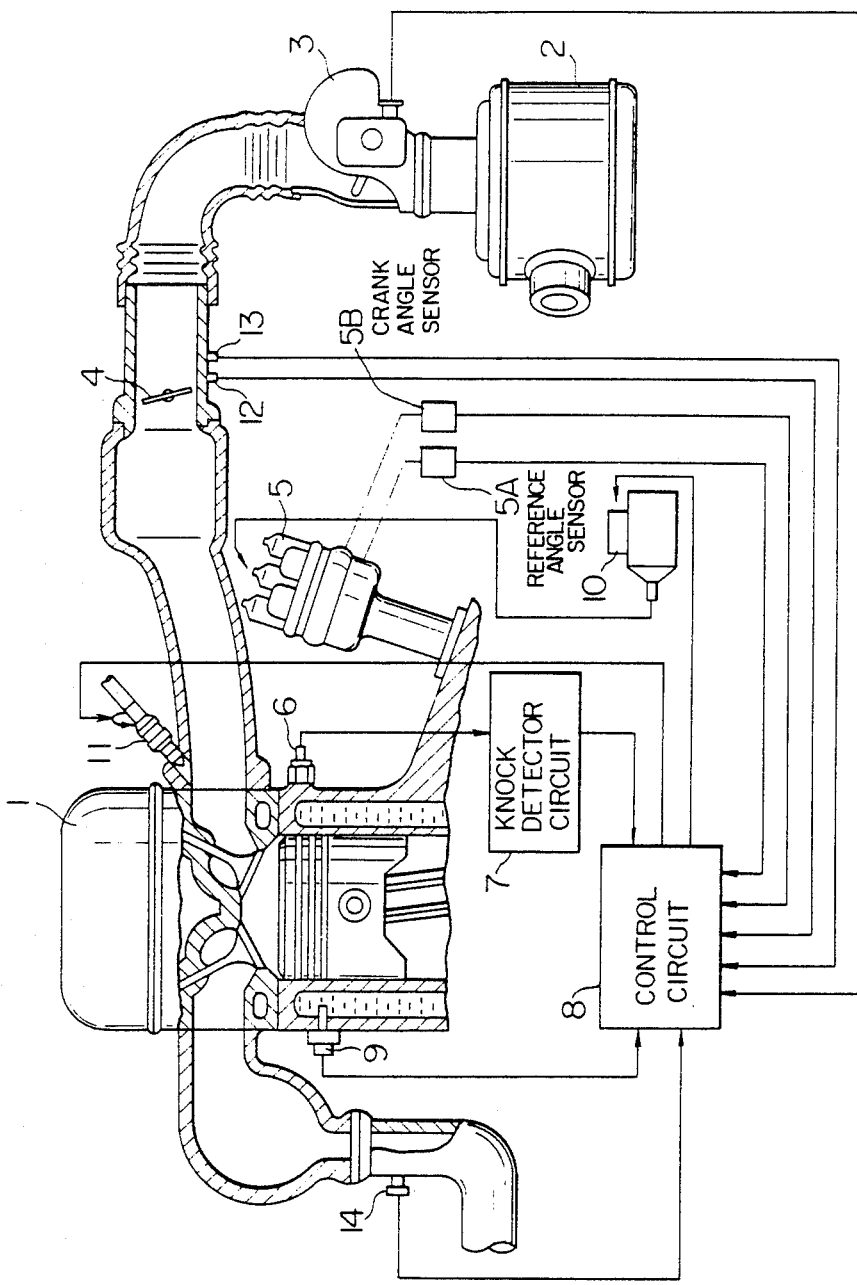
FIG. 1 is a schematic diagram showing the overall construction of an ignition timing control system for an internal combustion engine embodying the invention.

Referring to FIG. 1 showing an overall construction of an ignition timing control system for an internal combustion engine embodying the invention, there are illustrated a four-cylinder four-cycle engine 1, an air cleaner 2, an air flow meter 3 adapted to detect an amount of engine intake air and produce a signal representative of the amount, a throttle valve 4, and a distributor 5 incorporating a reference angle sensor 5A for detecting a reference crank angle position (for example, top dead center) of the engine and a crank angle sensor 5B for generating an output signal at intervals of a predetermined crank angle. A knock sensor 6 of a piezo-electric element type or an electromagnetic element (magnet and coil) type is adapted to detect vibrations of an engine block caused by knocking in the engine, and a knock detector circuit 7 is connected to receive an output signal of the knock sensor for detecting knocking generated in the engine. A water temperature sensor 9 generates a signal representative of a temperature of cooling water in the engine, a full-close switch (idle switch) 12 produces a signal when the throttle valve 4 is fully closed, a full-open switch (power switch) 13 produces a signal when the throttle valve 4 is substantially fully opened, and an $O_2$ sensor 14 produces an output signal which depends on whether the air/fuel (A/F) ratio of exhaust gas is rich or lean relative to the stoichiometric A/F ratio.

A control circuit 8 is responsive to the output signals from the sensors and switches set forth above to control ignition timing and A/F ratio of the engine, and an igniter and ignition coil 10 is responsive to an ignition timing control signal produced from the control circuit 8 to interrupt the supply of power to the ignition coil. A high voltage generated across the ignition coil is applied, at a proper timing, to an ignition plug through a distributor section of the distributor 5 so as to fire the ignition plug. An injector 11 is adapted to inject fuel into an intake manifold at a fuel injection timing and for a fuel injection time (t), the fuel injection timing and injection time being determined by the control circuit 8.

Figure 2:
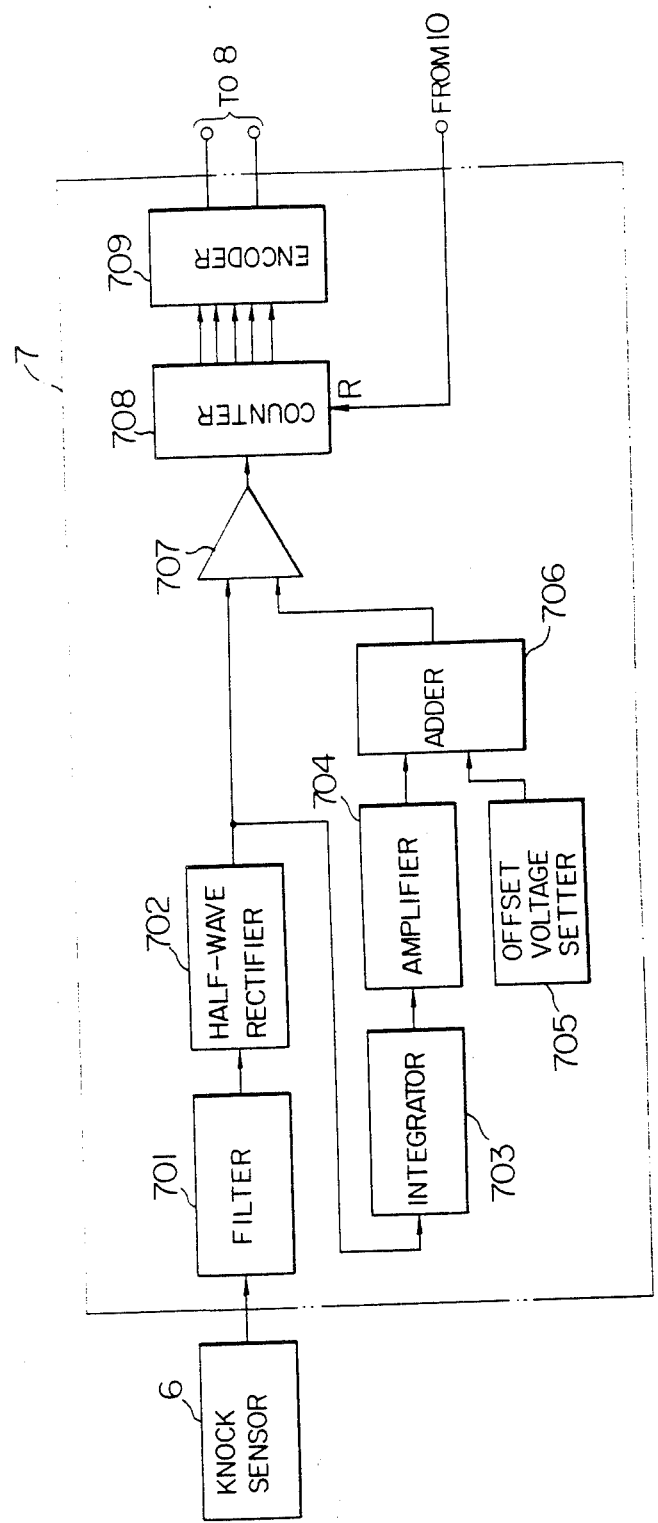
FIG. 2 is a block diagram of a knock detector circuit in the system of FIG. 1.

To detail the knock detector circuit 7 with reference to FIG. 2, it comprises a filter 701 such as a band-pass or high-pass filter for selectively deriving a knock frequency component from the output signal of the knock sensor 6, a half-wave rectifier 702 for half-wave rectifying an output signal of the filter 701, an integrator 703 for integrating an output signal of the half-wave rectifier 702 so as to produce an average of a vibratory output signal of the knock sensor 6, an amplifier 704 for amplifying an output signal of the integrator 703 so as to produce a proper knock discriminating level, an offset voltage setter 705 comprising resistors and adapted to produce a shift voltage necessary for providing an output signal of the amplifier 704 with a noise margin, an adder 706 for adding the output signals of the amplifier 704 and offset voltage setter 705 so as to produce an ultimate knock discriminating level, a comparator 707 for comparing the output signal of the half-wave rectifier 702 with the output signal of the adder 706 and producing a pulse signal when the former is larger than the latter, indicating that a knock takes place, a counter 708 adapted to count the number of pulses of the pulse signal for conversion into binary bits, the counter into binary bits, the counter being reset in response to, for example, an ignition signal from the igniter 10, and a code converter (encoder) adapted to sort the output binary bits of the counter 708 in accordance with count values represented by them for conversion into a signal delivered to a reduced number of output lines.

Figure 3:
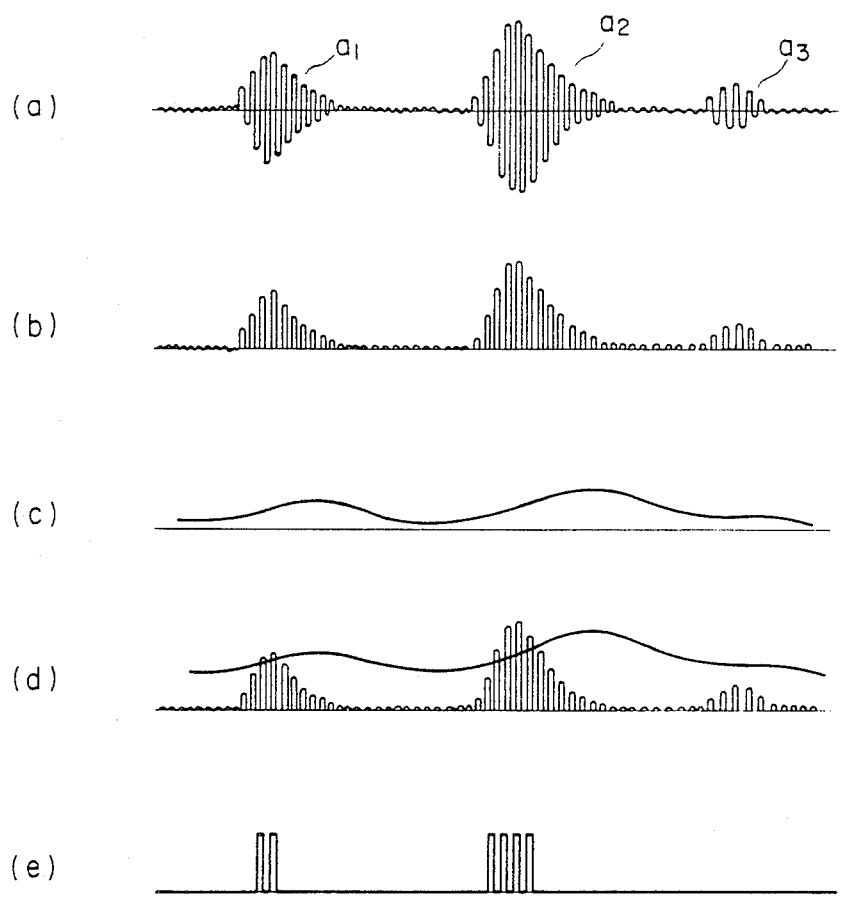
FIG. 3 is a waveform diagram useful in explaining the operation of the knock detector circuit.

The operation of the knock detector circuit will be described with reference to FIG. 3. Illustrated at section (a) in FIG. 3 is the output signal of the filter 701 which corresponds to a knock frequency component (6 to 9 KHz) selectively derived out of the output signal of the knock sensor 6. Waveforms $a_1$, $a_2$ and $a_3$ at section (a) correspond to three different knock states, respectively. In particular, waveform $a_1$ represents a relatively small knock, waveform $a_2$ a relatively large knock, and waveform $a_3$ a noise or an extremely small knock. The knock frequency component is subjected to half-wave rectification at the rectifier to produce a signal as shown at (b) in FIG. 3, and the rectified signal is integrated at the integrator 703 and amplified at the amplifier 704 to produce a signal as shown at (c) in FIG. 3. The signal shown at (c) is added with a shift voltage of the offset voltage setter 705 at the adder 706 to produce a signal, i.e., a knock discriminating level as shown at (d) in which the output signal shown at (b) of the rectifier 702 coexists for comparison purposes. Illustrated at (e) is the output signal of the comparator 707 in the form of a pulse signal which becomes a high level when the output signal shown at (b) of the rectifier 702 is larger than the knock discriminating level shown at (d) and which becomes a low level when the former is smaller than the latter. Since the number of pulses of this pulse signal corresponds to the intensity of knock (compare the number of pulses with corresponding waveform $a_1$ or $a_2$), the knock intensity can be converted into a pulse number which is counted by the counter 708.

Since the counter 708 is reset in response to an ignition signal, the intensity of one knock taking place at intervals of one ignition can be determined each time the ignition occurs. Binary bits corresponding to a count value of the counter 708 are fed to the encoder 709. This encoder 709 sorts the count value of the counter 708 into a plurality of groups and its output signal in accordance with the sorting is fed to the control circuit 8. For example, where the counter output signal is of five bits and the number of output lines of the encoder is two, count values 0 to 31 are sorted into four groups. Thus, information regarding the knock intensity in terms of four groups (null knock, small knock, medium knock and large knock) is fed to the control circuit 8. By virtue of the encoder 709, the number of signal lines coupled to the control circuit can be reduced extremely and hence the number of input ports of the control circuit 8 can also be reduced drastically.

Figure 4:
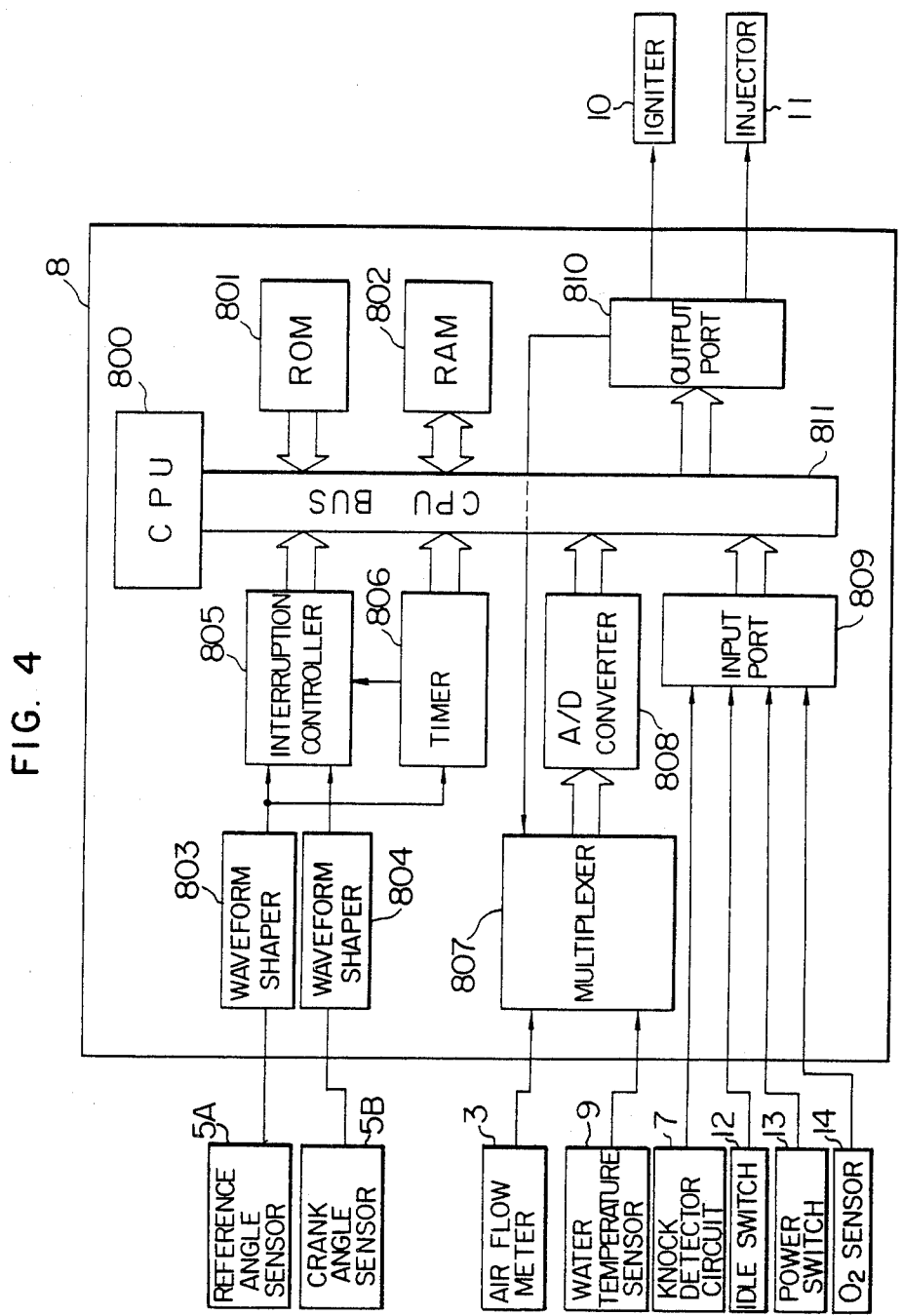
FIG. 4 is a block diagram of a control circuit in the system of FIG. 1.

The construction and operation of the control circuit 8 will now be described with reference to FIG. 4. A central processing unit (CPU) 800 for computing the ignition timing and the amount of fuel to be injected is a microprocessor of eight bits. A read only memory (ROM) 801 is adapted to store control programs and control constants necessary for operation, and a random acess memory (RAM) 802 is adapted to temporarily store operation data when the CPU 800 is operating in accordance with programs. A waveform shaper circuit 803 shapes a magnet pickup signal standing for the output signal of the reference angle sensor 5A, and a waveform shaper circuit 804 shapes the output signal of the crank angle sensor 5B.

An interruption controller 805 is responsive to external signals or internal signals to cause the CPU to interrupt, and a timer 806 of 16 bits is designed to count up by one at intervals of one clock period standing for the fundamental period for operation of the CPU. Engine speed and crank angle position are fetched into the CPU by means of the timer 806 and interruption control 805 as follows. Thus, the CPU reads a count value of the timer each time an interruption occurs in response to the output signal of the reference angle sensor 5A. Since the timer count value is incremented at intervals of one clock period (for example, 1 μs), a time interval between successive reference angle sensor signals, that is, a time for the engine to make one revolution can be measured by computing the difference between a count value at the time of the present interruption and a count value at the time of the previous interruption.

The crank angle position can be determined in units of a crank angle of, for example, 30° cA with respect to a reference represented by the top dead center signal from the reference angle sensor 5A because the output signal is produced from the crank angle sensor 5B at intervals of a predetermined crank angle (for example, 30° cA). Crank angle signals generated at intervals of 30° cA are used as reference points for generation of ignition timing control signals.

A multiplexer 807 switches a plurality of analog signals to connect them to an analog/digital (A/D) converter 808 at timings which are controlled by a control signal produced from an output port 810. In this embodiment, an intake-air amount signal from the air flow meter 3 and water temperature signal from the water temperature sensor 9 are applied, as the analog signals, to the multiplexer and switched to the A/D converter 808 for conversion into a digital signal. An input port 809 for reception of digital signals receives, in this embodiment, a knock signal from the knock detector circuit 7, an idle signal from the idle switch 12, a power signal from the power switch 13, and a rich/lean signal from the $O_2$ sensor 14.

The output port 810 delivers out digital signals such as an ignition timing control signal fed to the igniter 10, a fuel injection control signal fed to the injector 11, and the control signal fed to the multiplexer 807. The CPU sends control signals and data signals to a CPU bus 811 for controlling peripheral circuits and effecting transmission/reception of data.

Figure 5:
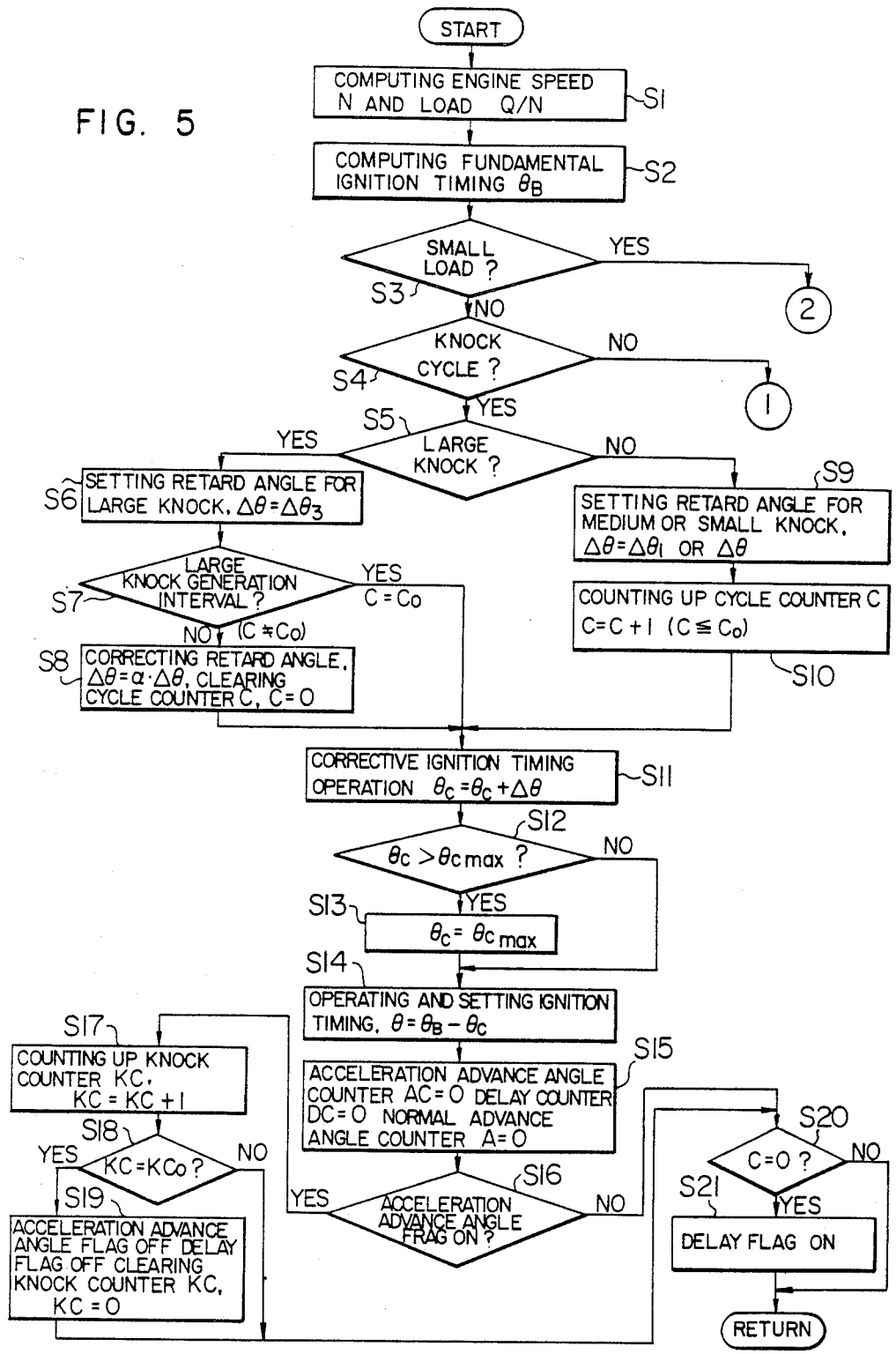
Figure 6:
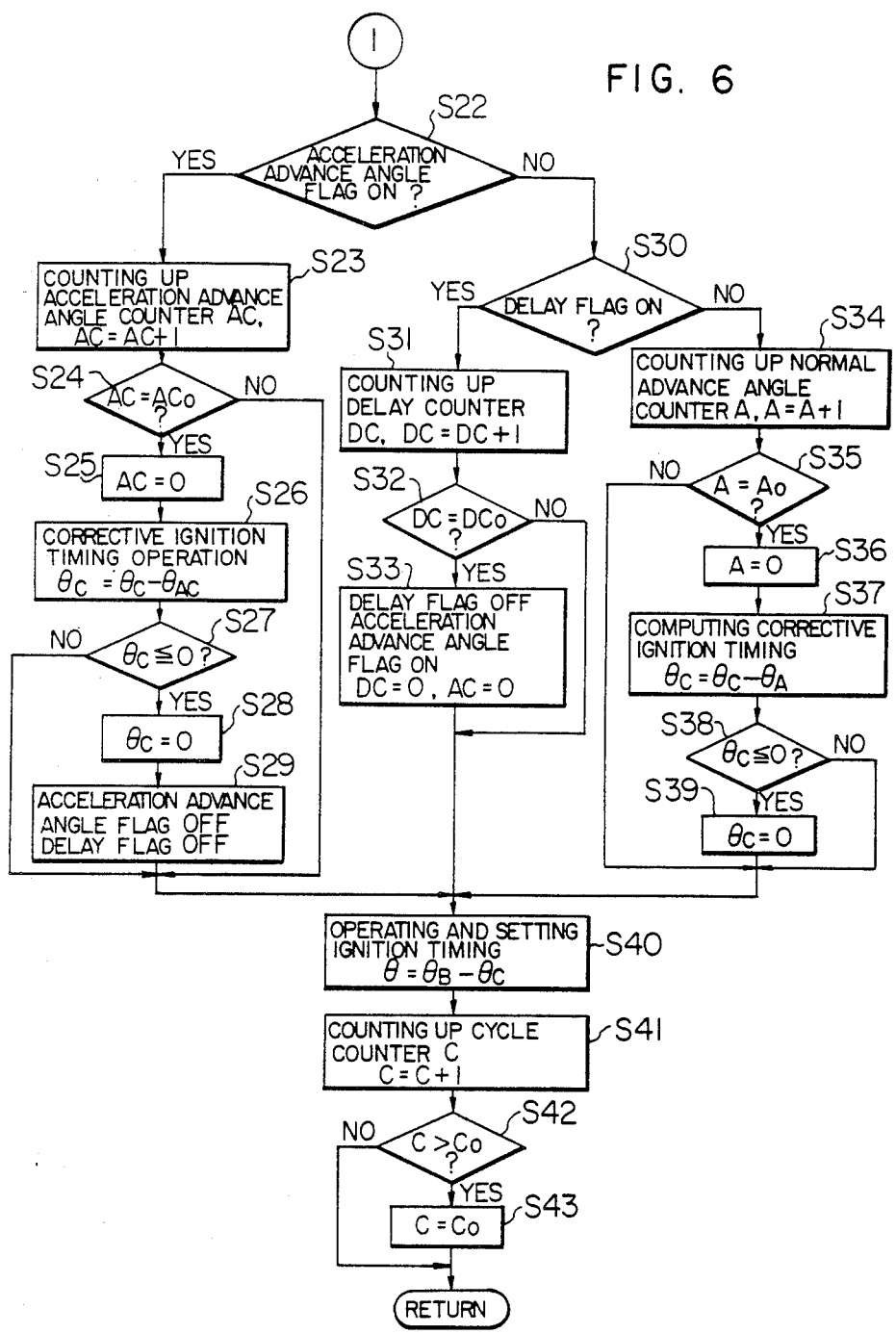

Reference should now be made to FIGS. 5 to 7 showing flow charts illustrative of a first method for ignition timing calculation. As shown in FIG. 5, engine speed N and load Q/N are computed on the basis of the signals from the reference angle sensor and the air flow meter (step S1). The load on the engine is proportional to Q/N, where Q is the air flow meter output signal representative of an amount of intake air. The engine speed N measured from the reference angle sensor output signal in this embodiment may alternatively be determined from the crank angle sensor output signal if the microcomputer has a sufficient capacity. Then, on the basis of the engine speed N and load Q/N thus measured, a fundamental ignition timing $\theta_B$ is computed from a two-dimensional map of N and Q/N which has been stored in a memory (step S2). When the load Q/N is smaller than a predetermined value, indicating that the load is too small to generate a knock (step S3), the program branches to ② continued to FIG. 7. Unless the load is so small as mentioned above, it is judged as to whether the present combustion cycle is a knock cycle on the basis of the output signal from the knock detector circuit (step S4). In the absence of a knock, the program branches to ① continued to FIG. 6. In the presence of a knock, it is judged as to whether the knock is relatively large (step S5). In this embodiment, the intensity of knock is sorted into three hierarchial groups—large, medium and small. Two or more hierarchial groups are sufficient for sorting the knock intensity and any knocks other than those falling within the lowest hierarchial may be sorted into a group of relatively large knock.

When the present knock is judged as a large knock, a retard angle $\Delta\theta$ for this knock is set to a relatively large value $\Delta\theta_3$ which is 1.5° cA, for example (step S6). In other words, the retard angle $\Delta\theta$ is set in accordance with the knock intensity, and it may be set to 0.5° cA for a small knock and 1° cA for a medium knock (step S9). The amounts of retard angle $\Delta\theta_i$ constructed as $\Delta\theta_1 = 0.5°$ cA, $\Delta\theta_2 = 1°$ cA and $\Delta\theta_3 = 1.5°$ cA are stored as constants in the ROM. Subsequently, it is examined as to whether the knock generation interval is larger than a predetermined value, for example, four cycles (step S7). The knock generation interval can be determined by reading a value of a cycle counter C provided for the RAM. More particularly, th cycle counter C operable in terms of a software is cleared to zero when a relatively large knock occurs (step S8) and it continues to count the ignition cycle until a subsequent, relatively large knock takes place. This counter is so programmed as to count up until a predetermined value $C_o$ is reached and to hold the value $C_o$, thereby preventing the counter from overflowing.

When the knock generation interval is larger, the program proceeds to a step for corrective ignition timing operation (step S11). Conversely, when the knock generation interval is smaller, the value of the cycle counter C is reset to zero and the retard angle $\Delta\theta$ is corrected (step S8). The correction of the retard angle $\Delta\theta$ in the case of a smaller knock generation interval is effected so that the ignition angle is greatly retarded to enhance muffling effects against noisy sounds due to knocking during acceleration. For example, the retard angle $\Delta\theta$ is doubled ($\alpha=2$) with drastically improved muffling effects during acceleration obtained.

When the present knock is not large, a retard angle for a medium or small knock, for example, $\Delta\theta_1 = 0.5°$ cA or $\Delta\theta_2 = 1°$ cA is set (step S9). Only a retard angle for a small knock may of course be set when only two hieratical groups of large and small knocks are adopted. The cycle counter C is then counted up by one within the predetermined value $C_o$.

Thereafter, the total retard angle starting from the fundamental ignition timing, that is, the corrective ignition timing $\theta_C$ ($=\theta_C+\theta$) is determined (step S11). The corrective ignition timing $\theta_c$ has an upper limit $\theta_{Cmax}$ to eliminate a retard angle beyond the upper limit (steps S12 and S13). An ultimate ignition timing $\theta$ for the subsequent ignition is computed pursuant to $\theta = \theta_B - \theta_C$ and set into an ignition timer (step S14). An acceleration advance angle counter AC, a delay counter DC and a normal advance angle counter A, all operable in terms of a software, are then cleared to zero (step S15).

Thereafter, it is examined by an acceleration advance angle flag whether the present advance angle rate is increasing (step S16). The acceleration advance angle flag is raised (ON) only while the advance angle rate is increasing. When this flat is ON with the advance angle rate increasing, a knock counter KC is counted up by one (step S17). This knock counter KC operable in terms of a software is adapted to indicate how many knocks are generated after the advance angle rate has increased. When the value of the knock counter KC reaches a predetermined value $KC_o$, for example, 1 or 2 (step S18), it is judged that a limit ignition timing for a knock under normal running is reached and the advance angle rate is returned to an initial small value. To this end, the acceleration advance angle flag and a delay flag are rendered OFF and the knock counter is also reset to zero (step S19). Subsequently or when the acceleration advance angle flag is rendered OFF as previously, the value of the cycle counter C is examined (step S20). When the value of the cycle counter C is zero wherein the generation interval of relatively large knocks is small, it is judged that the engine running goes on with acceleration and the advance angle rate prepares for increase. Namely, the delay flag is rendered ON (step S21) and the main program restores.

In the absence of knock cycles during the present cycle, operation proceeds as will be described with reference to FIG. 6. It is first examined as to whether the acceleration advance angle flag is rendered ON or OFF (step S22). When the flag is raised, the acceleration advance angle counter AC is counted up by one in order to effect advance angle operation at a large advance angle rate for acceleration (step S23). This counter AC operable in terms of a software repeats counting from zero until a predetermined value $AC_o$ is reached. If the counter AC does not reach the predetermined value $AC_o$ (for example, two cycles), then the present corrective ignition timing $\theta_C$ is maintained as it is (step S24). If the $AC_o$ is reached, however, the counter AC is reset (step S25) and the corrective ignition timing $\theta_C$ is subtracted by a predetermined angle $\theta_{AC}$, for example, 0.5° cA (step S26). As a result, the ignition timing is corrected to advance by $\theta_{AC}$. By executing the acceleration advance angle in the absence of a knock in this manner, rapid advance angle operation can be carried out through 0.5° cA ($\theta_{AC}=0.5°$ cA) at intervals of two cycles ($AC_o=2$) in this example. Then, when the corrective ignition timing $\theta_C$ becomes negative (step S27), this negative value is corrected to zero (step S28) and the acceleration advance angle flag and delay flag are rendered OFF (step S29), so that the ignition timing can be prevented from being advanced beyond the fundamental ignition timing $\theta_B$ and the advance angle rate can be returned to a small value when the fundamental ignition timing $\theta_B$ is reached, namely, the retard angle $\theta_C$ is made zero by knock controlling.

When it is judged in step S22 of FIG. 6 that the acceleration advance angle flag is OFF, it is examined in step S30 as to whether the delay flag is ON or OFF. If the delay flag is ON, the delay counter DC is counted up by one in preparation for increasing the advance angle rate (step S31). The present corrective ignition timing is kept until the delay counter DC reaches a predetermined value $DC_o$ (step S32) and with the predetermined value $DC_0$ reached, the acceleration advance angle flag is rendered ON, thus bringing the procedure into the rapid advance angle process (step S33). In step S33, the delay flag is also rendered OFF and the counters DC and AC are cleared to zero. In this embodiment, following four-cycle delay, the rapid advance angle operation initiates. If a knock takes place during the delay period, the rapid advance angle operation restores after the delay period following completion of the knock has elapsed.

When the delay flag is OFF in step S30, the advance angle rate of a small value for the normal running is used. The normal advance angle counter A counts the normal advance angle. Thus, the counter A is counted up by one at intervals of one non-knock cycle (step S34) and when it reaches a predetermined value $A_o$, for example, 30 cycles (step S35), it is cleared to zero (step S36) and the corrective ignition timing $\theta_C$ is corrected by a predetermined value $\theta_A$, for example, 0.5° cA to advance to $\theta_C=\theta_C-\theta_A$ (step S37). Accordingly, in this embodiment, the advance angle during the normal running is corrected by 0.5° cA at intervals of 30 cycles. As in the advance angle correction during acceleration, the corrective ignition timing $\theta_C$ is prevented from becoming negative (steps S38 and S39). In this manner, the ignition timing $\theta$ is corrected to advance in the case of non-knock cycle.

The ignition timing $\theta$ ($=\theta_B-\theta_C$) is set into the timer (step S40) and counted down. Thereafter, the value of the cycle counter C is counted up by one (step S41) within a predetermined value $C_o$ (step S42), thus returning the procedure to the main program.

Operation for a small load is carried out as will be described with reference to FIG. 7. In the case of a small load, the delay flag and the acceleration advance angle flag are rendered OFF (step S44) to return the advance angle rate to a small value for normal running. Various counters (acceleration advance angle counter and the like) are reset or initialized and the corrective ignition timing $\theta_C$ is made zero (step S45). Consequently, the ignition timing $\theta$ equals $\theta_B$ (step S47), establishing a maximum advance angle state. The initial establishment of the maximum advance angle state under the small load is effective to avoid performance degradation due to retard angles.

The engine is ignited by means of the igniter and ignition coil controlled by the ignition timing as computed above.

Figure 8:
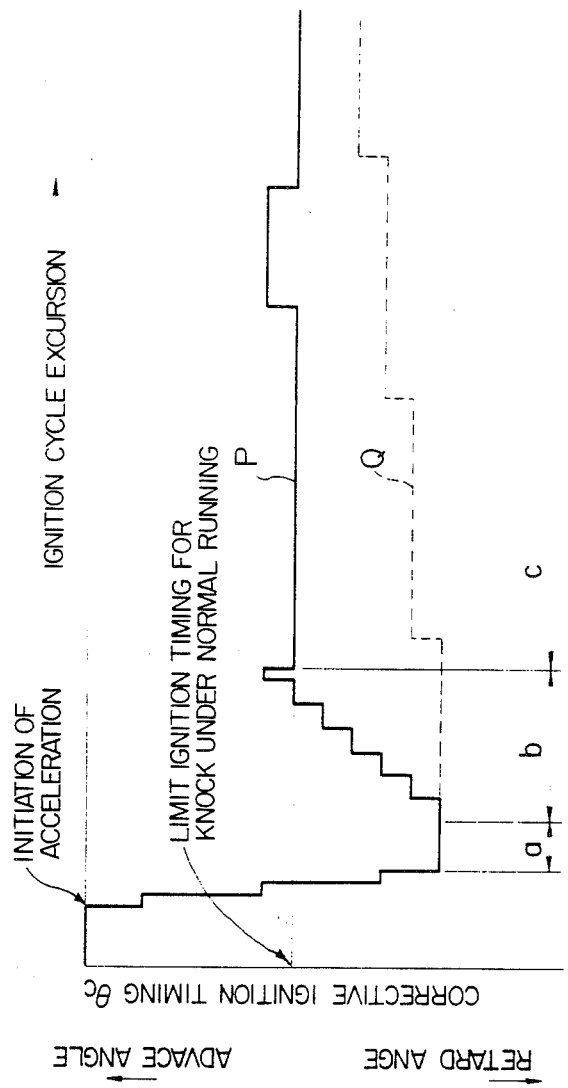
FIG. 8 is a graph showing a control excursion of ignition timing according to the invention.

Turning to FIG. 8, the ignition timing control excursion according to the system of the present invention is graphically shown, where the abscissa represents excursion of ignition cycle and the ordinate represents corrective ignition timing, that is, the total retard angle in the knock controlling. In FIG. 8, a solid curve P is representative of the ignition timing control excursion according to the present system and a dashed curve Q is representative of that according to the prior art system. Illustrated in association with solid curve P are a delay region a, an acceleration advance angle region b and a normal advance angle region c. It should be understood that recovery to the limit ignition timing for knocking under normal running is faster in the present invention than in the prior art system. This eliminates delay in acceleration and assures excellent acceleration performance. It will be also appreciated that occurrence of a knock at the end of the region b contributes to recovery to the advance angle rate for normal running, thereby ensuring stability under the normal running.

The retard angle $\Delta\theta$ occurring at intervals of one knock is varied in accordance with the knock intensity and the knock generation interval in the foregoing embodiment but it may be varied with one of the above factors or it may not be varied. The variation in the retard angle $\Delta\theta$ as in the foregoing embodiment is of course effective to improve muffling effects under acceleration.

The knock generation interval is determined between relatively large knocks in the foregoing embodiment but it may be determined regardless of the magnitude of knock so that the determination of the knock generation interval depends on the presence or absence of knock whereby when the interval is small and the present knock is large, the advance angle rate is increased. It is essential that the advance angle rate should be varied on the basis of the knock generation interval and knock intensity.

In the foregoing embodiment, the judgement of knock generation interval and the increment of advance angle counter and delay counter are effected in accordance with excursion of the ignition cycle. Some or all of them may however be effected in unit of time by so using the timer 806 in FIG. 4.

In increasing the advance angle rate, the initiation of the increase is delayed for a time in the foregoing embodiment. Although effects of the invention are promoted, such a delay in increasing the advance angle rate is not always necessary.

Further, as described previously, a target value of the advance angle after increasing the advance angle rate is directed to the fundamental ignition timing $\theta_B$, i.e., the total retard angle $\theta_C$ but it may be directed to an ignition timing $\theta_B - \beta$ which is delayed by an angle $\beta$ relative to $\theta_B$ or to an ignition timing $\theta_C - \alpha$ which leads by a predetermined angle $\alpha$ relative to the present total retard angle $\theta_C$.

Also, the amounts of retard angle in the past may be stored in a memory and the stored retard angle may be used as a target ignition timing.

If, in the above alternative, the ignition timing prevailing when increasing the advance angle rate leads relative to the target ignition timing, the increase of the advance angle rate will be nullified.

The decrease of advance angle rate as effected at the time of occurrence of one knock after the increase of advance angle rate in the excursion of FIG. 8 may be effected two or more predetermined times each time the knock occurs. In this case, the advance angle rate may gradually decreased at intervals of the occurence of the knock and ultimately, it may completely be returned to an initial small value when the occurrence of a predetermined number of knocks is completed.

Further, if the constants such as the threshold value $C_o$ of the knock generation interval is varied with engine conditions such as engine revolution or load, the controlling will be carried out in a more delicate manner.

The fundamental ignition timing $\theta_B$ as determined on the basis of the map stored in the memory in the foregoing embodiment may otherwise be determined by means of a governor included in the distributor or a vacuum advancer.

Further, while in the foregoing embodiment the signal judged of knocking by the knock detector circuit is inputted to the microcomputer, the knock judgement may be accomplished by the microcomputer by itself. For example, a peak of the output signal from the knock sensor may be detected by a peak hold circuit, and a peak hold signal therefrom is subjected to A/D conversion and inputted to the microcomputer. In this case, the peak hold signal may be averaged over a number of cycles to provide a knock discriminating level.

In the foregoing embodiment, in order to vary the advance angle rate, the number of ignition cycles (or holding time) held at the same ignition timing is varied but the advance angle per one cycle may be varied without varying the number of ignition cycles (or holding time). For example, an acceleration advance angle of 3° cA per 30 ignition cycles and a normal advance angle of 1° cA per 30 ignition cycles may be adopted. Effects can be course be promoted by the variation of the advance angle rate which is carried out by varying both the number of ignition cycles held (or holding time) and the advance angle per one cycle because the acceleration advance angle can be coupled smoothly to the knock limit under the normal running when the advance angle is smoothly effected by decreasing the number of ignition cycles held (or hodling time) and by slightly decreasing the advance angle per one cycle. In any case, the advance angle rate under acceleration must be larger than that under normal running. For example, an acceleration advance angle of 0.2° cA per one ignition cycle and a normal advance angle of 1° cA per 30 ignition cycles may be adopted.

Although in the foregoing embodiment the control circuit 8 is materialized by a microcomputer, it may be constituted by an analog circuit. For example, a capacitor and a constant current source may be used to provide a charging/discharging characteristic necessary for advancing and retarding angle. Since in this case the advancing of angle is effected continuously, the advance angle rate can be varied by changing the ramp of the charging/discharging characteristic. To this end, a plurality of constant current sources are provided and they are switched to vary the charging/discharging characteristic of the capacitor.

Figure 9:
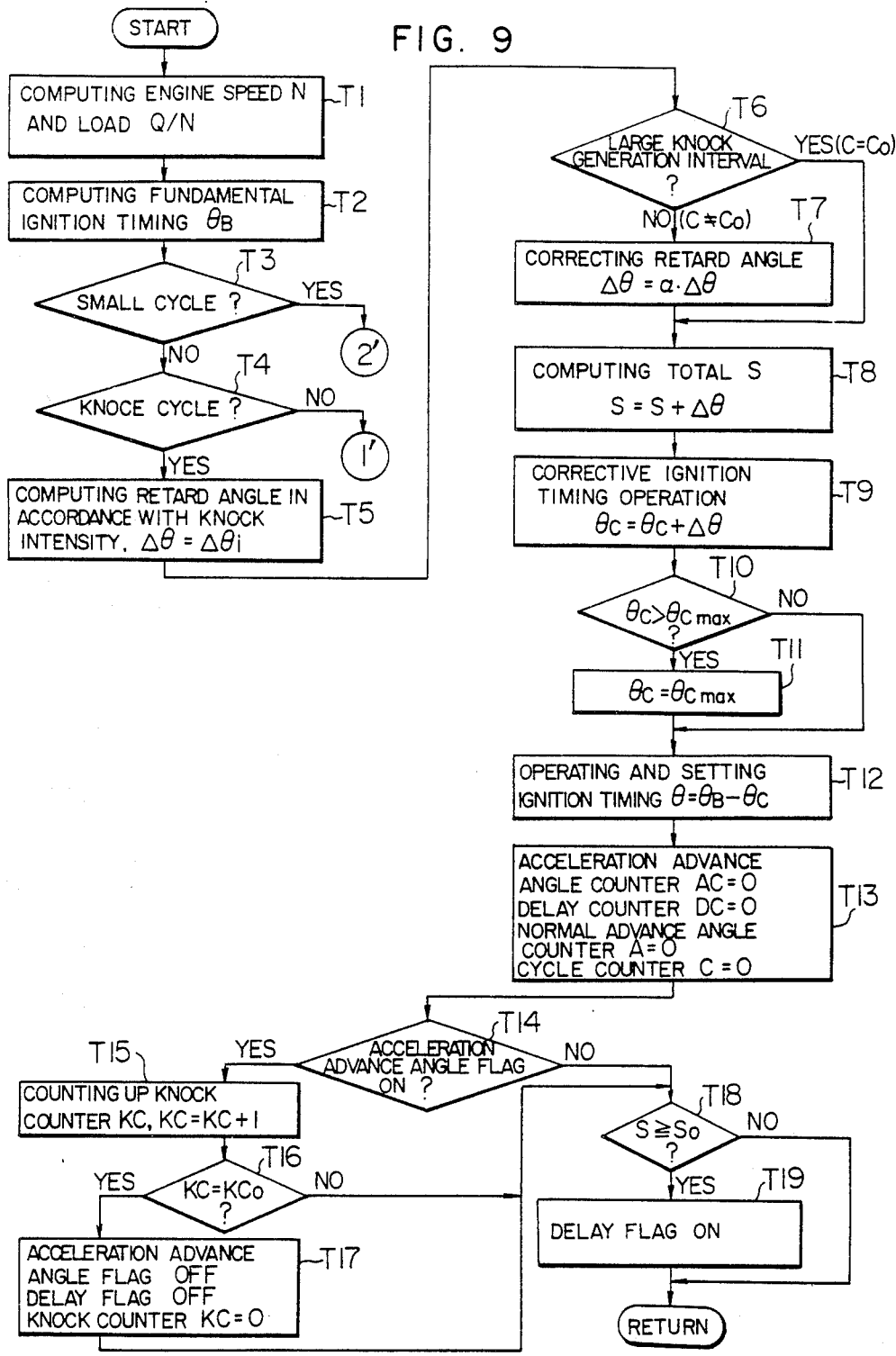
Figure 10:
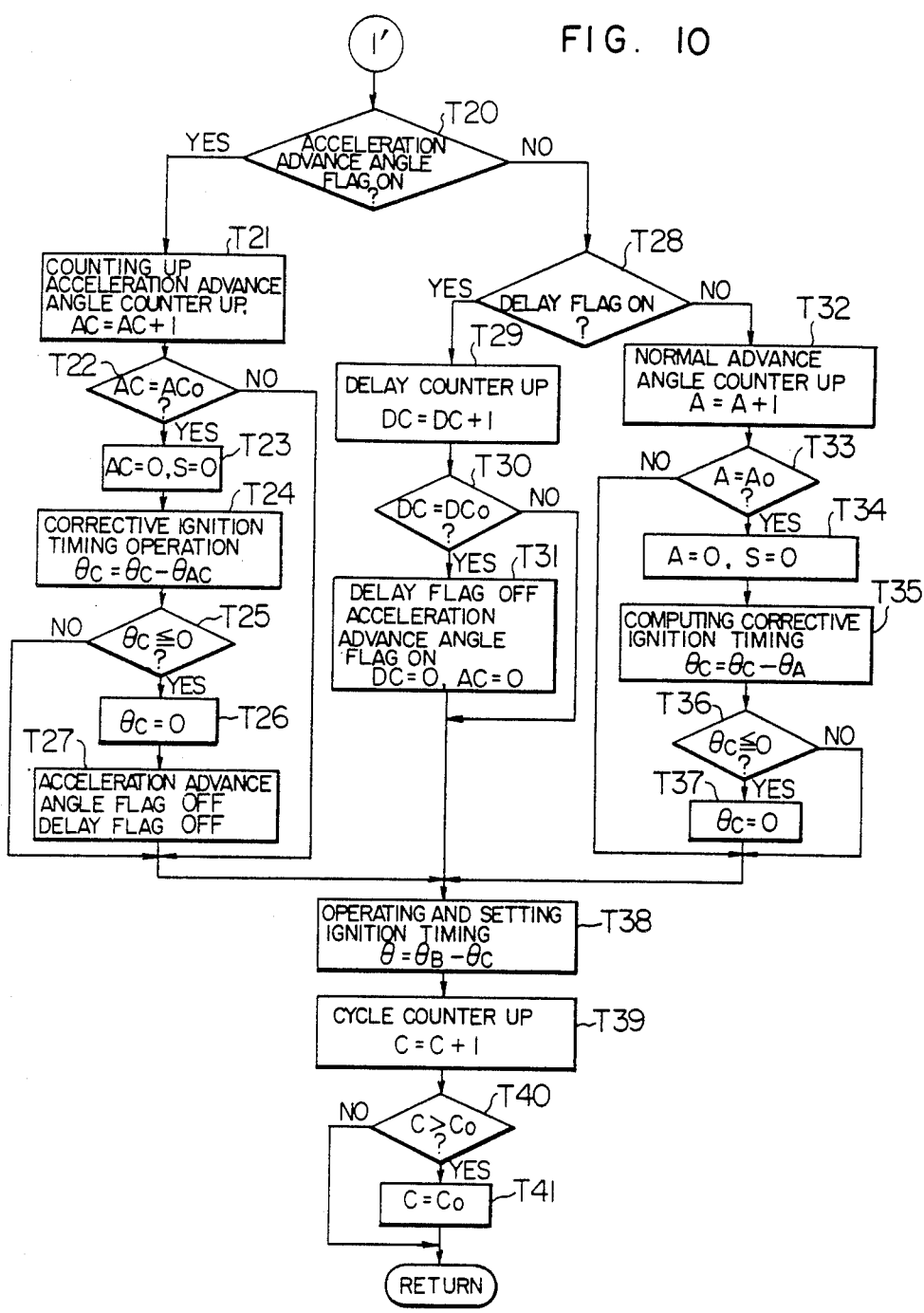

Reference should now be made to FIGS. 9 to 11 showing flow charts illustrative of a second method for ignition timing calculation. As shown in FIG. 9, engine speed N and load Q/N are first computed on the basis of the signals from the reference angle sensor and the air flow meter (step T1). Then, on the basis of the engine speed N and load Q/N thus determined, a fundamental ignition timing $\theta_B$ is computed from a two-dimentional map of N and Q/N which has been stored in a memory (step T2).

When the load Q/N is smaller than a predetermined value, indicating that the load is too small to generate a knock (step T3), the program branches to ② continued to FIG. 11. Unless the load is so small as mentioned above, it is judged as to whether the present combustion cycle is a knock cycle on the basis of the output signal fom the knock detector circuit (step T4). In the absence of a knock, the program branches to ① continued to FIG. 10. In the presence of a knock, a retard angle $\Delta\theta$ is set in accordance with the knock intensity (step T5), and it may be set to 0.5° cA for a small knock, 1° cA for a medium knock and 1.5° cA for a large knock. The amounts of retard angle $\Delta\theta_i$ graded according to the knock intensity and constructed as $\Delta\theta_1 = 0.5°$ cA, $\Delta\theta_2 = 1°$ cA and $\Delta\theta_3 = 1.5°$ cA are stored as constants in the ROM.

Subsequently, it is examined as to whether the knock generation interval is larger than a predetermined value, for example, four cycles (step T6). The knock generation interval can be determined by reading a value of a cycle counter C provided for the RAM. More particularly, the cycle counter C operable in terms of a software is cleared to zero when a knock occurs and it continues to count the ignition cycle until a subsequent knock takes place. This counter is so programmed as to count up until a predetermined value $C_o$ is reached and to hold the value $C_o$, thereby preventing the counter from overflowing. When the knock generation interval is large, the advancing of angle is not effected but the total S of consecutive retard angles is computed (step T8). Conversely, when the knock generation interval is small, the retard angle $\Delta\theta$ is corrected (step T7) and thereafter the total S is computed (step T8). The correction of the retard angle $\Delta\theta$ in the case of a small knock generation interval is effected so that the ignition angle is greatly retarded to enhance muffling effects against noisy sounds due to knocking during acceleration. For example, the retard angle $\Delta\theta$ is doubled ($\alpha = 2$) with drastically improved muffling effects during acceleration obtained.

Thereafter, the total retard angle starting from the fundamental ignition timing, that is, the corrective ignition timing $\theta_C (=\theta_C+\Delta\theta)$ is determined (stp T9). The corrective ignition timing $\theta_C$ has an upper limit $\theta_{Cmax}$ to eliminate a retard angle beyond the upper limit (steps T10 and Tll). An ultimate ignition timing $\theta$ for the subsequent ignition is computed pursuant to $\theta=\theta_B-\theta_C$ and set into an ignition timer (step T12).

An acceleration advance angle counter AC, a delay counter DC, a normal advance angle counter A and the cycle counter C, all operable in terms of a software, are then cleared to zero (step T13). Thereafter, it is examined by an acceleration advance angle flag whether the present advance angle rate is increasing (step T14). The acceleration advance angle flag is raised (ON) only while the advance angle rate is increasing. When this flag is ON with the advance angle rate increasing, a knock counter KC is counted up by one (step T15). This knock counter KC operable in terms of a software is dapated to indicate how many knocks are generated after the advance angle rate has increased. It is judged as to whether the value of the knock counter KC reaches a predetermined value $KC_o$, for example, 1 or 2 (step T16). When the predetermined value is reached, indicating that a limit ignition timing for a knock under normal running is reached, the aevance angle rate is returned to an initial small value. To this end, the acceleration advance angle flag and a delay flag are rendered OFF and the knock counter is also reset to zero (step T17).

Subsequently or when the acceleration advance angle flag is rendered OFF, the value of the total S is examined (step T18). When the total S exceeds a predepredetermined value, for example, 4° cA, it is judged that the engine goes on with acceleration and the advance angle rate prepares for increase. Namely, the delay flag is rendered ON (step T19) and the main program restores.

In the absence of knock cycles during the present cycle, operation proceeds as will be described with reference to FIG. 10. It is first examined as to whether the acceleration advance angle flag is rendered ON or OFF (step T20). When the flag is raised, the acceleration advance angle counter AC is counted up by one in order to effect advance angle operation at a large advance angle rate for acceleration (step T21). This counter AC operable in terms of a software repeats counting from zero until a predetermined value $AC_o$ is reached. It is then judged as to whether the counter AC reaches the predetermined value $AC_o$, for example, two cycles (step T22). If the predetermined value $AC_o$ is not reached, then the present corrective ignition timing $\theta_C$ is maintained as it is. If reached, the counter AC and the total S are rest to zero (step T23) and at the same time, the corrective ignition timing $\theta_C$ is subtracted by a predetermined angle $\theta_{AC}$, for example, 0.5° cA (step T24). As a result, the ignition timing is corrected to advance by $\theta_{AC}$. By executing the acceleration advance angle in the absence of a knock in this manner, rapid advance angle operation can be carried out through 0.5° cA ($\theta_{AC}=0.5°$ cA) at intervals of two cycles ($AC_o=2$) in this example.

Then, when the corrective ignition timing $\theta_C$ becomes negative (step T25), this negative value is corrected to zero (step T26) and the acceleration advance angle flag and delay flag are rendered OFF (step T27), so that the ignition timing can be prevented from being advanced beyond the fundamental ignition timing $\theta_B$ and the advance angle rate can be returned to a small value when the fundamental ignition timing $\theta_B$ is reached, namely, the retard angle $\theta_c$ is made zero by knock controlling.

When it is judged in step T20 of FIG. 10 that the acceleration advance angle flag is OFF, it is examined in step T28 as to whether the delay flag is ON or OFF. If the delay flag is ON, indicating that the advance angle rate prepares for increase, the present corrective ignition timing is kept until the delay counter DC reaches a predetermined value $DC_o$ and with the predetermined value $DC_o$ reached (step T30), the acceleration advance angle flag is rendered ON, thus bringing the procedure into the rapid advance angle process. Accordingly, in this embodiment, following four-cycle dealy, the rapid advance angle operation initiates.

When the delay flag is OFF, the advance angle rate of a small value for the normal running is used. The normal advance angle counter A counts the normal advance angle. Thus, the couner A is counted up by one at intervals of one non-knock cycle (step T32) and it is reset when a knock cycle occurs. It is judged as to whether this counter A reaches a predetermined value $A_o$, for example 30 cycles (step T33). When the predetermined value $A_o$ is reached, the counter A and the total S are rest to zero (step T34) and the corrective ignition timing $\theta_C$ is corrected by a predetermined value $\theta_A$, for example, 0.5° cA to advance to $\theta_C=\theta_C-\theta_A$ (step T35). Accordingly, in this embodiment, the advance angle during the normal running is corrected by 0.5° cA at intervals of 30 cycles. As in the advance angle correction during acceleration, the corrective ignition timing $\theta_C$ is prevented from becoming negative (steps T36 and T37). In thid manner, the ignition timing $\theta$ is corrected to advance in the case of non-knock cycle. The ignition timing $\theta$ ($=\theta_B-\theta_C$) is set into the timer (step T38) and counted down. Thereafter, the value of the cycle counter C is counted up by one (step T39), thus returning the procedure to the main program.

Operation for a small load is carried out as will be described with reference to FIG. 11. In the case of a small load, the delay flag and the acceleration advance angle flag are rendered OFF (step T42) to return the advance angle rate to a small value for normal running. Various counters (acceleration advance angle counter and the like) and the total S are reset or initialized (step T43) and the corrective ignition timing $\theta_C$ is made zero (step T44). Consequently, the ignition timing $\theta$ equals $\theta_B$, establishing a maximum advance angle state. The initial establishment of the maximum advance angle state under the small load is effective to avoid performance loss due to retard angles.

The engine is ignited by means of the igniter and ignition coil controlled by the ignition timing as computed above.

The ignition timing control excursion according to this embodiment is the same as that of the previous first method graphically shown in FIG. 8. Thus, it should be understood that recovery to the limit ignition timing for knocking under normal running is faster in this embodiment than in the prior art system. This eliminates delay in acceleration and assures excellent acceleration performance. It will be also appreciated that occurrence of a knock at the end of the region b contributes to recovery to the advance angle rate for normal running, thereby ensuring stability under the normal running.

As in the first embodiment, the retard anble $\Delta\theta$ occurring at intervals of one knock is also varied in accordance with the knock intensity and the knock generation interval in this embodiment but it may be varied with one of the above factors or it may not be varied. Without the variation, the intensity discriminating section (counter 708 and encoder 709) of the knock detector circuit 7 can be dispensed with. In other words, for the sake of examining only the presence or absence of the knock in such a case, a latch or flip-flop circuit may substitute for the conter 708 and encoder 709. As described above, the number of occurrence frequencies of the retard angle may substitute for the total S when the retard angle is constant.

Figure 13:
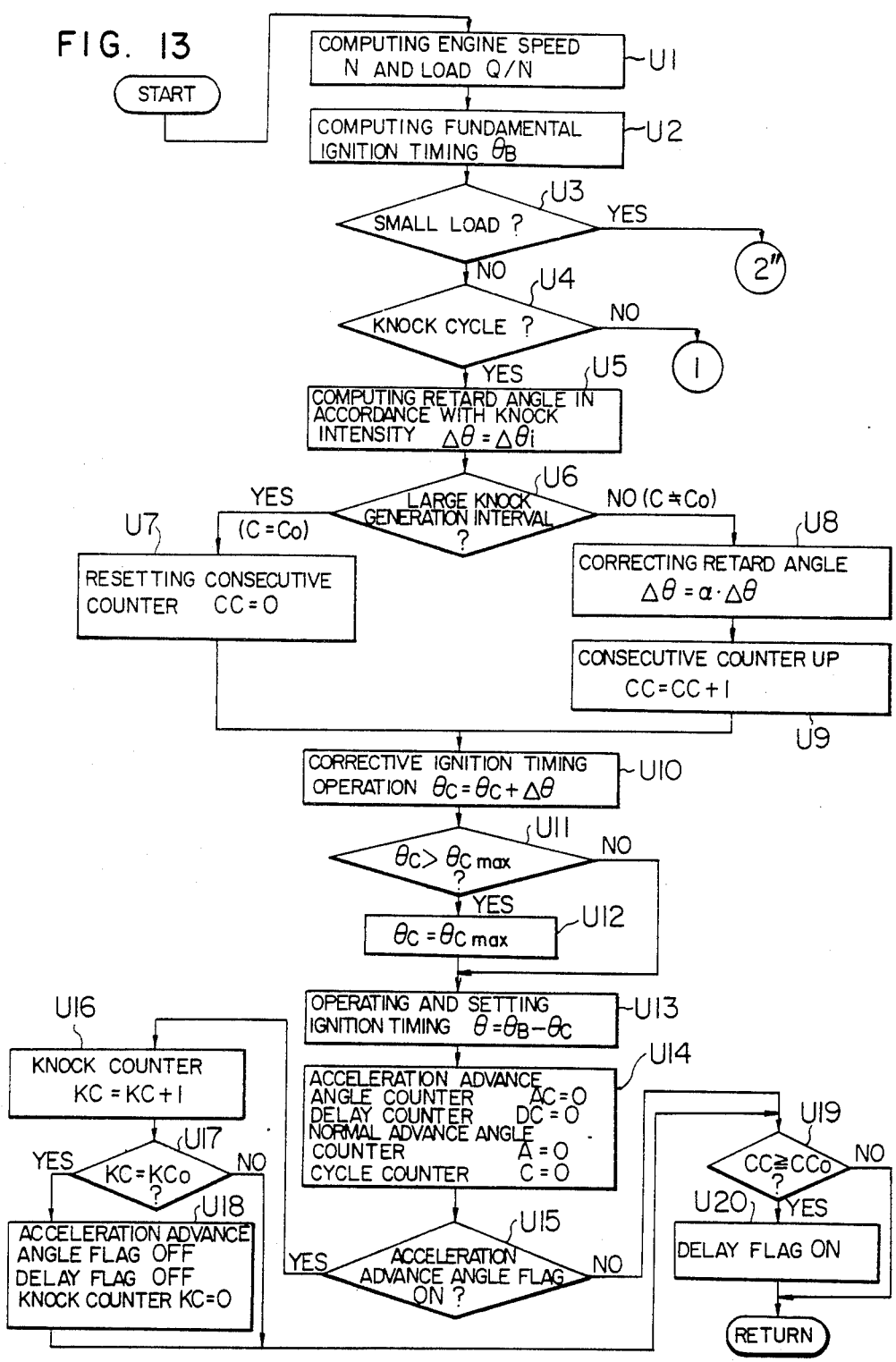

Reference should now be made to FIGS. 13 and 14 showing flow charts illustrative of a third method for ignition timing calculation. As shown in FIG. 13, engine speed N and load Q/N are computed on the basis of the signals from the reference angle sensor and the air flow meter (step U1). Then, on the basis of the engine speed N and load Q/N thus, determined, a fundamental ignition timing $\theta_B$ is computed from a two-dimensional map of N and Q/N which has been stored in a memory (step U2).

Thereafter, when the load Q/N is smaller than a predetermined value, indicating that the load is too small to generate a knock (step U3), the program branches to (2") continued to FIG. 14. Unless the load is so small as mentioned above, it is judged as to whether the present combustion cycle is a knock cycle on the basis of the output signal from the knock detector circuit (step U4). In the absence of a knock, the program branches to (1") continued to FIG. 14. In th presence of a knock, a retard angle $\Delta\theta$ is set in accordance with intensity of the knock (step U5) to, for example, $\Delta\theta_1=0.5°$ cA for a small knock, $\Delta\theta_2=1°$ cA for a medium knock and $\Delta\theta_3=1.5°$ cA for a large knock. The amounts of retard angle $\Delta\theta_i$ construed as $\Delta\theta_1=0.5°$ cA, $\Delta\theta_2=1°$ cA and $\Delta\theta_3=1.5°$ cA are stored as constants in the ROM. Subsequently, it is examined as to whether the knock generation interval is larger than a predetermined value, for example, four cycles (step U6). The knock generation interval can be determined by reading a value of a cycle counter C provided for the RAM. More particularly, the cycle counter C operable in terms of a software is cleared to zero when a knock occurs and it continues to count the ignition cycle until a subsequent knock takes place. This counter is so programmed as to count up until a predetermined value $C_o$ is reached and to hold the value $C_o$, thereby preventing the counter from overflowing.

When the knock generation interval is larger, a consecutive counter CC operable in terms of a software is reset to zero (step U7). Conversely, when the knock generation interval is smaller, the consecutive counter CC is counted up by one (step U9) and the retard angle $\Delta\theta$ is corrected (step U10). This consecutive counter CC is adapted to determine the number of knocks occurring at a small generation interval. The correction of the retard angle $\Delta\theta$ in the case of a small knock generation interval is effected so that the ignition angle is greatly retarded to enhance muffling effects against noisy sounds due to knocking during acceleration. For example, the retard angle $\Delta\theta$ is doubled ($\alpha=2$) with drastically improved muffling effects during acceleration obtained. Thereafter, the total retard angle starting from the fundamental ignition timing, that is, the corrective ignition timing $\theta_C$ ($=\theta_C+\Delta\theta$) is determined (step U10). The corrective ignition timing $\theta_C$ has an upper limit $\theta_{Cmax}$ to eliminate a retard angle beyond the upper limit (step U11 and U12). An ultimate ignition timing for the subsequent ignition is computed pursuant to $\theta=\theta_B=\theta_C$ and set into an ignition timer (step U13). An acceleration advance angle counter AC, a delay counter DC, a normal advance angle counter A and the cycle counter C, all operable in terms of a software, are then cleared to zero (step U14).

Thereafter, it is examined by an acceleration advance angle flag whether the present advance angle rate is increasing (step U15). The acceleration advance angle flag is raised (ON) only while the advance angle rate is increasing. When this flag is ON with the advance angle rate increasing, a knock counter KC is counted up by one (step U16). This counter KC operable in terms of a software is adapted to indicate how many knocks are generated after the advance angle rate has increased. When the value of the knock counter KC reaches a predetermined value $KC_o$, for example, 1 or 2 (step U17), it is judged that a limited ignition timing for a knock under normal running is reached and the advance angle rate is returned to an initial small value. To this end, the acceleration advance angle flag and a delay flag are rendered OFF and the knock counter is is also reset to zero (step U18). Subsequently or when the acceleration advance angle flag is rendered OFF, the value of the consecutive counter CC is examined. When the consecutive counter CC reaches a predetermined value $CC_o$ ($\geq 2$) in step U19 wherein the small knock generatoin interval consecutively occur, it is judged that the engine running goes on with acceleration and the advance angle rate prepares for increase. Namely, the delay flag rendered ON (step U20) and the main program restores.

In the absence of knock cycles during the present cycle, operation proceeds in the same manner as the previous first method and will not be described herein.

Operation for a small load is carried out as will be described with reference to FIG. 14. In the case of a small load, the delay flag and the acceleration advance angle flag are rendered OFF (step U21) to return the advance angle rate to a small value for normal running. Various counters (acceleration advance angle counter and the like) are reset or initialized (step U22) and the corrective ignition timing $\theta_C$ is made zero (step U23). Consequently, the ignition timing $\theta$ equals $\theta_B$, establishing a maximum advance angle state (step U24). The initial establishment of the maximum advance angle state under the small load is effective to avoid performance loss due to retard angles.

The engine is ignited by means of the igniter and ignition coil controlled by the ignition timing as computed above.

The ignition timing control excursion according to this embodiment is the same as that of the previous first method graphically shown in FIG. 8.

What is claimed is:

1. An ignition timing control system for an internal combustion engine comprising:

a knock sensor for detecting engine knock and providing a signal indicative of an amount of engine knock;

ignition timing control means for generating an ignition timing control signal having a timing angle that is a predetermined function of said knock signal, including means for determining the presence or absence of knock on the basis of predetermined criteria and retarding said timing angle when knock is present and advancing said timing angle when knock is absent, said ignition timing control means determining a state of the knock immediately before advancing the timing angle and controlling the rate of advance in accordance with the state of knock; and igniter means, responsive to the ignition timing control signal, for generating an ignition signal for said engine.

2. A system according to claim 1 wherein said ignition timing control means comprises means for effecting an initial advance angle at a first high advance angle rate and a subsequent advance angle at a second low advance angle rate lower than said first high advance angle rate when the knock is larger than a predetermined large knock threshold.

3. An ignition timing control system for an internal combustion engine comprising:

a knock sensor for detecing engine knock and providing a knock signal indicative of an amount of engine knock;

ignition timing control means for generating an ignition timing control signal having a timing angle that is a predetermined function of said knock including means for advancing and retarding said timing angle according to said predetermined function, including first means for determining an intensity of the knocks, second means for determining knock frequency, and advance angle rate control means for increasing advance angle rate of said timing angle by determining an acceleration state according to said first and second means and for decreasing said advance angle rate when the timing, after the increase of the advance angle rate reaches a target ignition timing or when the knocks are generated a predetermined number of frequencies before the target ignition timing is reached; and igniter means, responsive to the ignition timing control signal, for generating an ignition signal for said engine.

4. A system according to claim 3 wherein said advance angle rate control means includes means for determining target ignition timing which retards by a predetermined crank angle $\beta°$ ($\beta \geq 0$) relative to a maximum advance angle of ignition timing determined in accordance with engine speed and load of the engine.

5. A system according to claim 3 wherein said advance angle rate control means includes means for determining the target ignition timing which advances by a predetermined crank angle $\alpha°$ ($\alpha > 0$) relative to an ignition timing at which said advance angle rate is increased.

6. A system according to claim 3 wherein said advance angle rate control means includes means for determining the target ignition timing which is computed on the basis of a previous ignition timing which has been stored and held.

7. A system according to claim 3 wherein said advance angle rate control means increases the advance angle rate at a time which is delayed by an amount of a predetermined number of cycles or a predetermined time relative to a time at which consecutive occurrence of a plurality of events wherein the knock generation interval is small takes place, whereby with the occurrence of a knock during the delay period, the increase of said advance angle rate is again delayed by said amount after completion of the knock.

8. An ignition timing control system for an internal combustion engine comprising:

a knock sensor for detecting knock and providing a knock signal indicative of an amount of engine knock;

ignition timing control means responsive to said knock signal, for providing an ignition timing signal and varying the timing of said ignition timing signal stepwise in accordance with said knock signal, said ignition timing control means including advance angle control means for increasing an advance angle rate of said ignition timing signal when the total of consecutive retard angles exclusive of any advance angle exceeds a predetermined angle and for decreasing said advance angle rate when the ignition timing, after the increase of the advance angle rate, reaches a target ignition timing or when the knocks are generated a predetermined number of frequencies before the target ignition tming is reached; and igniter means, responsive to the ignition timing control signal, for generating an ignition signal for said engine.

9. An ignition timing control system for an internal combustion engine comprising:

a knock sensor for detecting engine knock and providing a knock signal indicative of an amount of engine knock;

ignition timing control means for generating an ignition timing control signal having a timing angle that is a predetermined function of said knock signal including means for advancing and retarding said timing angle, said ignition timing control means including advance angle control means for increasing an advance angle rate when there is a consecutive occurrence of a plurality of events wherein the knock generation interval is smaller than a predetermined threshold and for decreasing said advance angle rate when ignition timing after the increase of the advance angle rate reaches a target ignition timing or when the knocks are generated a predetermined number of frequencies before the target ignition timing is reached; and igniter means, responsive to the ignition timing control signal, for generating an ignition signal for said engine.

* * * * *